(12) United States Patent
Qu et al.

(10) Patent No.: US 7,220,709 B1
(45) Date of Patent: *May 22, 2007

(54) PROCESS OF DIVERTING STIMULATION FLUIDS

(75) Inventors: Qi Qu, Spring, TX (US); Scott McCarthy, Fulshear, TX (US); Daniel Patrick Vollmer, Lafayette, LA (US)

(73) Assignee: BJ Services Company, Houston, TX (US)

( * ) Notice: Subject to any disclaimer, the term of this patent is extended or adjusted under 35 U.S.C. 154(b) by 649 days.

This patent is subject to a terminal disclaimer.

(21) Appl. No.: 10/100,778

(22) Filed: Mar. 19, 2002

Related U.S. Application Data (63) Continuation-in-part of application No. 09/648,327, filed on Aug. 25, 2000, now Pat. No. 6,509,301, which is a continuation-in-part of application No. 09/383,323, filed on Aug. 26, 1999, now Pat. No. 6,432,885.

(51) Int. Cl.
*C09K 8/58* (2006.01)
(52) U.S. Cl. ............... 507/236; 507/203; 507/261; 507/266; 507/267; 166/270; 166/270.1; 166/305.1
(58) Field of Classification Search ............ 166/305.1, 166/270, 270.1; 507/236, 240, 244, 245, 507/203, 261, 266, 267
See application file for complete search history.

(56) References Cited

U.S. PATENT DOCUMENTS

| | | | |
|---|---|---|---|
| 2,793,189 A | 5/1957 | Schuessler | 252/8.5 |
| 2,943,051 A | 6/1960 | Lummus | 252/8.5 |
| 3,006,845 A | 10/1961 | Van Dyke et al. | 252/8.5 |
| 3,057,797 A | 10/1962 | Anderson et al. | 252/8.5 |
| 3,761,410 A | 9/1973 | Mondshine et al. | 252/8.5 C |
| 3,797,575 A * | 3/1974 | Dill et al. | 166/282 |
| 3,960,736 A | 6/1976 | Free et al. | 252/8.55 R |
| 4,223,732 A * | 9/1980 | Carriay et al. | 166/291 |
| 4,259,191 A | 3/1981 | Wagner | 252/8.55 |
| 4,323,124 A | 4/1982 | Swan | 166/303 |
| 4,502,540 A | 3/1985 | Byham | 166/274 |
| 4,517,100 A | 5/1985 | Nance et al. | 252/8.5 C |
| 4,614,236 A | 9/1986 | Watkins et al. | 166/304 |
| 4,704,229 A | 11/1987 | Brunel et al. | 252/352 |
| 4,796,702 A | 1/1989 | Scherubel | 166/308 |
| 4,811,791 A * | 3/1989 | Harnoy et al. | 166/305.1 |

(Continued)

FOREIGN PATENT DOCUMENTS

GB       2 001 377 A       1/1979

(Continued)

OTHER PUBLICATIONS

U.S. Appl. No. 60/343,145, filed Dec. 2001, Fu et al.*

(Continued)

*Primary Examiner*—Philip C. Tucker
(74) *Attorney, Agent, or Firm*—Jones & Smith, LLP; John Wilson Jones (57) ABSTRACT

A process for stimulating a formation is disclosed wherein a diverting fluid is used to divert an acid treatment package from a high permeability or damaged portion of a formation to a low permeability or undamaged portion of a formation. The fluid preferably forms vesicles.

29 Claims, 5 Drawing Sheets

U.S. PATENT DOCUMENTS

| | | | | |
|---|---|---|---|---|
| 5,057,234 | A | 10/1991 | Bland et al. | 252/8.51 |
| 5,141,920 | A | 8/1992 | Bland et al. | 507/136 |
| 5,238,067 | A | 8/1993 | Jennings, Jr. | 166/307 |
| 5,238,627 | A | 8/1993 | Matsuhisa et al. | 264/63 |
| 5,318,956 | A | 6/1994 | Mueller et al. | 507/139 |
| 5,360,558 | A | 11/1994 | Pakulski et al. | 252/8.551 |
| 5,432,152 | A | 7/1995 | Dawson et al. | 507/103 |
| 5,529,122 | A | 6/1996 | Thach | 166/281 |
| 5,551,516 | A | 9/1996 | Norman et al. | 166/308 |
| 5,593,954 | A | 1/1997 | Malchow, Jr. | 507/135 |
| 5,657,547 | A | 8/1997 | Uttecht et al. | 33/304 |
| 5,707,940 | A | 1/1998 | Bush et al. | 507/138 |
| 5,710,109 | A | 1/1998 | Surles | 507/114 |
| 5,806,195 | A | 9/1998 | Uttecht et al. | 33/304 |
| 5,807,810 | A | 9/1998 | Blezard et al. | 507/103 |
| 5,821,414 | A | 10/1998 | Noy et al. | 73/152.54 |
| 5,964,295 | A | 10/1999 | Brown et al. | 166/308 |
| 5,979,557 | A | 11/1999 | Card et al. | 166/300 |
| 6,035,936 | A | 3/2000 | Whalen | 166/308 |
| 6,194,354 | B1 | 2/2001 | Hatchman | 507/134 |
| 6,435,277 | B1 * | 8/2002 | Qu et al. | 166/281 |
| 6,929,070 | B2 * | 8/2005 | Fu et al. | 166/308.2 |
| 2003/0139298 | A1 * | 7/2003 | Fu et al. | 507/200 |

FOREIGN PATENT DOCUMENTS

| | | |
|---|---|---|
| WO | WO 98/56497 | 12/1998 |

OTHER PUBLICATIONS

McCarthy, Scott M., et al.; "The Successful Use of Polymer-Free Diverting Agents for Acid Treatments in the Gulf of Mexico," Society of Petroleum Engineers, SPE 73704.

Bergenholtz, Johan, et al.; "Formation of AOT/Brine Multilamellar Vesicles," Langmuir 1996, vol. 12, No. 13, pp. 3122-3126.

Gradzielski, M.; "Novel Gel Phase: A Cubic Phase of Densely Packed Monodisperse, Unilamellar Vesicles," Physical Chemistry B; vol. 101, No. 10, Mar. 6, 1997.

Author Unknown, "Spontaneous Vesicles from Aqueous Solutions of Aerosol OT and Choline Chloride Compounds," Journal of Colloid and Interface Science, vol. 145, No. 2, Sep. 1991; pp. 598-600.

Walker, Scott A., et al.; "electrostatic Control of Spontaneous Vesicle Agggregation," Langmuir 1997, vol. 13, No. 19, pp. 5076-5081.

Walker, Scott A., et al.; "Controlled Multi-Stage Self-Assembly of Vesicles," Mat. Res. Soc. Symp. Proc., vol. 372, 1995 Materials Research Society; pp. 95-100.

Herb, Craig A., et al.; "Structure and Flow in Surfactant Solutions," ACS Symposium Series, 206th National Meeting of American Chemical Society, Chicago, Ill. Aug. 22-27, 1993.

Spector, M.S., et al.; "Topology of Multivesicular Liposomes, a Model Biliquid Foam," Langmuir 1996, vol. 12, No. 20, 1996, p. 4704.

Jung, H.T., et al.; "The Origins of Stability of Spontaneous Vesicles," PNAS, Feb. 13, 2001, vol. 98, No. 4, pp. 1353-1357.

Firouzi, A., "Cooperative Organization of Inorganic-Surfactant and Biomimetic Assemblies," Science, Feb. 24, 1995, vol. 267, pp. 1138-1143.

Lin et al., Cryo-TEM Imaging the Flow-Induced Transition from Vesicles to Threadlike Micelles, *The Journal of Physical Chemistry*, vol. 104, No. 22, p. 5263-5271 (Jun. 8, 2000).

Zheng, et al., "Mixed Micelles of Nonionic Surfactants and Unchanged Block Coploymers in Aqueous Solutions: Microstructure Seen by Cryo-TEM," *Langmuir*, vol. 16, No. 16, pp. 6453-6459 (Aug. 8, 2000).

Bellare, et al., "Controlled Environmentl Vitrification System: An Improved Sample Preparation Technique," *Journal of Electron Microscopy Technique* 10:87-111 (1988).

Zubay, G, *Biochemistry*, third edition, p. 174-175 (1993).

Alberts, et al., "Membrane Structure," *Molecular Biology of the Cell*, third edition, p. 478-480 (1994).

Author unknown; undated diagram; "Large Unilamellar Vesicle,".

* cited by examiner

PROCESS OF DIVERTING STIMULATION FLUIDS

CROSS REFERENCE TO RELATED APPLICATIONS

This application is a continuation-in-part of U.S. patent application Ser. No. 09/648,327, filed Aug. 25, 2000, now U.S. Pat. No. 6,509,301, which is a continuation-in-part of U.S. patent application Ser. No. 09/383,323, filed Aug. 26, 1999, now U.S. Pat. No. 6,432,885.

BACKGROUND OF THE INVENTION

1. Field of the Invention

This invention relates to acid stimulation of subterranean formations to increase the formation permeability for increased hydrocarbon production from hydrocarbon bearing formations having inconsistent permeabilities. More specifically, this invention relates to a method of re-directing formation-stimulating fluids to target production zones and diverting the stimulation fluids away from high permeability or undamaged zones by temporarily blocking high permeability zones.

2. Background of the Invention

Matrix acidizing, the process of injecting a formation stimulation fluid such as acid or other acid-forming materials that may react with minerals in the formation to increase the formation permeability, is a common method used to stimulate the formation. This process enhances production of the hydrocarbon product from a hydrocarbon producing formation. To obtain the maximum benefits of matrix acidizing, it is often desirable to treat the entire productive interval of the formation with the stimulation fluid. In many cases, the high permeability or non-damaged intervals are adjacent to the damaged or low permeability intervals in a productive hydrocarbon formation. As the stimulation fluid is pumped, it will preferentially enter the interval of least resistance. This interval is typically the high permeability or non-damaged zone. As stimulation fluid enters the high permeability or undamaged formation, the stimulation fluid will react with the formation material and open additional flow paths. As a result, the high permeability interval receives most or all of the stimulation while the desired low permeability or damaged zones do not receive the desired stimulation.

The overall success or failure of many of these treatments is often judged by the ability to inject or direct the acid into the damaged or lower permeability zone. In order to re-direct the stimulation fluids from the non-damaged intervals into the damaged intervals, a pressure differential across the high permeability or non-damaged intervals may be created. This pressure differential will typically force the stimulation fluid into new portions of the reservoir that otherwise would not receive the stimulation fluid.

A number of techniques and materials have traditionally been available for diverting the stimulation fluid. One way to achieve diversion is mechanically, by using drillpipe or coil tubing-conveyed tools equipped with mechanical packers. Each individual interval may then be isolated and then stimulated. This process is extremely time consuming and frequently very costly.

In addition to mechanical diverting means, chemical diverting agents such as viscous gels or foams may be used to temporarily block the high permeability interval and divert the stimulation fluids into the desired low permeability or damaged intervals. It is desirable for these viscous gels to be stable at the bottom hole temperature and also to be removable from the formation rapidly after the treatment in order to eliminate any potential damage to the high permeability intervals. One chemical diverting fluid is a gelled hydroxyethylcellulose (HEC) pill. This technique relies upon the viscosity of the pill to influence the injection pressure of the interval it enters. As the pill enters the formation, the viscosity of the pill will restrict the injection of other fluids into this area. As the injection pressure increases within this portion of the interval, other sections of the interval will break down and begin accepting fluid. This technique is severely limited if the temperature of the gelled HEC exceeds 200° F. Above this temperature, the base viscosity and life of the pill is greatly decreased. Another problem seen with gelled HEC is that the blocked zone may be damaged from the polymeric residues left inside the porous media once the acid treatment is completed.

Foams may also be used as a diverting method for acid stimulation. Foams typically are generated through a blend of surfactants and/or a polymer. The addition of the polymer may also cause formation damage, as described above, while the use of nitrogen gas tanks and other associated pumping equipment are typically required for foam used as acid stimulation diverting agent. This may not be practical in many cases, especially for offshore acid treatments, as the operation is often limited by available deck space on the rig or vessel. In addition, foams typically become unstable above 250° F.

Polymer-based gels have often been used as diverting agents in combination with acid stimulation; for instance, HEC or hydropropyl guar gum may be used as diverting agent for acid stimulation in fractured formations. This technique normally combines hydraulic fracturing with the acid treatment, which is significantly different from and more costly than a simple acid treatment. Using a polymer based gel as diverting agent will normally result in formation damage caused by the polymer residue.

Another type of viscous fluid diverting agent used to assist in formation stimulation is a surfactant or surfactant mixture. One such viscoelastic fluid forms micelles. These wormlike micelles are sensitive to hydrocarbons. By utilizing this sensitivity, the fluid may selectively block water-bearing zones while the hydrocarbon-bearing zone is unaffected. However, this viscoelastic surfactant fluid typically cannot discriminate between zones with various permeabilities as long as the zones are hydrocarbon-bearing. Further, unlike polymer based fluids which rely upon filter cake deposition to control leak-off to the formation, viscoelastic surfactant diverting agents control fluid leak-off into the formation through the structure size of the micelles. The micellar based VES fluids usually have high leak-off rates to the formation due to the small size of the wormlike micelles. Rapid weaving and breaking of these structures also limits the ability of the micellar based viscoelastic system to control fluid leak-off. The temperature limitations for such a system is generally around 200° F. due to the low stability of micellar structure.

What is needed is a method for diverting the stimulation fluid from high permeability zones to desired low permeability zones. This method should preferably use a composition that does not damage the formation, and is easily removed from the formation.

SUMMARY OF THE INVENTION

The present invention overcomes the problems and disadvantages with current diverting fluids and methods by providing non-damaging methods for diverting acid stimulating fluids to the low permeability or damaged intervals adjacent to the high permeability or non-damaged intervals.

In one embodiment of the present invention, a process for injecting a diverting fluid into a formation is described. A diverting fluid which forms vesicles is injected into the formation. This injection is carried out at a pressure lower than the fracture pressure of the formation.

In another embodiment of the present invention, a process for injecting a diverting fluid into a formation is described. A diverting fluid is injected into the formation. The diverting fluid contains an amphoteric surfactant, water, and a non-aqueous solvent. This injection is carried out at a pressure lower than the fracture pressure of the formation.

In another embodiment of the present invention, a process for stimulating a formation is described. An acid stimulation package is injected into the formation, followed by the pumping of a spacer fluid and a diverter fluid.

In still another embodiment of the present invention, a process for stimulating a formation is disclosed. An acid stimulation package is injected into the formation, followed by the pumping of a spacer fluid. The diverter fluid is injected into the formation. The diverter fluid has an amphoteric surfactant, a non-aqueous solvent, water, and an internal breaker. The pH of the diverting fluid is then reduced. A second acid stimulation package is then injected into the formation. A diverter fluid is injected into the large pore throat portion of the formation. The diverter fluid is also injected into the small pore throat portion of the formation. The small pore throat invasion depth of the diverting fluid is less than the large pore throat invasion depth. An acid stimulation fluid package is injected into the formation.

Figure 5:
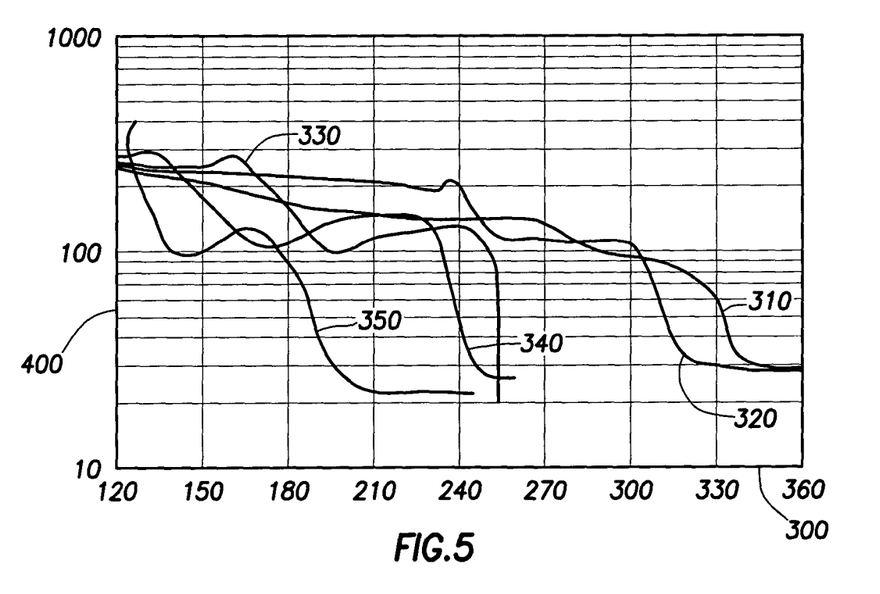
FIG. 5 is a depiction of the viscosity of the diverting fluid in one embodiment of the present invention at various pH levels.

An advantage of at least one embodiment of the present invention is that the diverter fluid exhibits properties very similar to cross-linked gels with extremely high viscosities in the low shear regime. In at least one embodiment of the present invention, the fluid maintains an average viscosity of more than 100 cp @ 100 s$^{-1}$ from ambient temperature to up to 300° F. Another significant advantage of preferred embodiments of the present invention is the response to low pH fluid, such as acid. Micellar systems rely upon the interaction with hydrocarbons or formation fluids to reduce viscosity, but the vesicle viscoelastic fluids lose viscosity at a low pH, as shown in FIG. 5. By controlling the time that the acid-forming agent reduces the pH, the time required for the fluid to lose viscosity can be controlled, creating a fluid that can be broken at a desired time.

Unlike polymer based gelled or crosslinked fluids, in preferred embodiments of the present invention, the diverting fluid is based on surfactant technology. The diverting fluid will not generally alter the original permeability after a diverting treatment. Without polymers or particles to hinder production rates, and without the limited temperature application window of other products, these fluids offer a highly useful alternative to the currently available diverting agents.

Other embodiments and advantages of the invention are set forth in part in the description which follows, and in part, will be obvious from this description, or may be learned from the practice of the invention.

DESCRIPTION OF THE DRAWINGS

The present invention is better understood by reading the following description of non-limitative embodiments with reference to the attached drawings wherein like parts in each of the several figures are identified by the same reference characters, and which are briefly described as follows.

DESCRIPTION OF THE PREFERRED EMBODIMENTS

As embodied and broadly described herein, the present invention is drawn to non-polymer-based viscoelastic surfactant diverting fluids and methods for diversion of stimulating fluids into lower permeability or damaged production zone during treatment of subterranean reservoirs.

Figure 1:
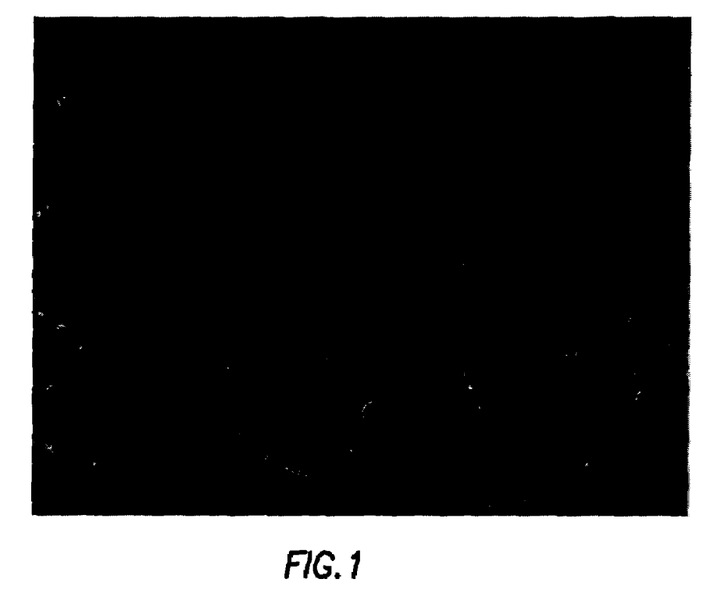
FIG. 1 is an illustration of the vesicular structure of one embodiment of a diverting fluid of the present invention.

The diverting fluids of this invention will preferably form vesicle structures. In general, vesicles are bi-layered aggregates formed from surfactants or phospholipids. The diameter of a vesicle generally varies from between about 200 Å to about 50 microns. The size of the aggregation structure of the vesicles is typically much larger than the wormlike micelles. This increase in aggregate structure size creates a much larger surface area. The vesicle structure is also a more stable system than the micellar system and does not continually lose shape and reform over time like the wormlike micelles. Vesicles in a particular system are not necessarily of a uniform size and may have a wide distribution. When the term "vesicle" is used herein it is meant to mean both unilamellar and multilamellar vesicles. FIG. 1 is a Cryo-TEM that illustrates the vesicle structure in a fluid in one embodiment of the present invention.

Figure 1A:
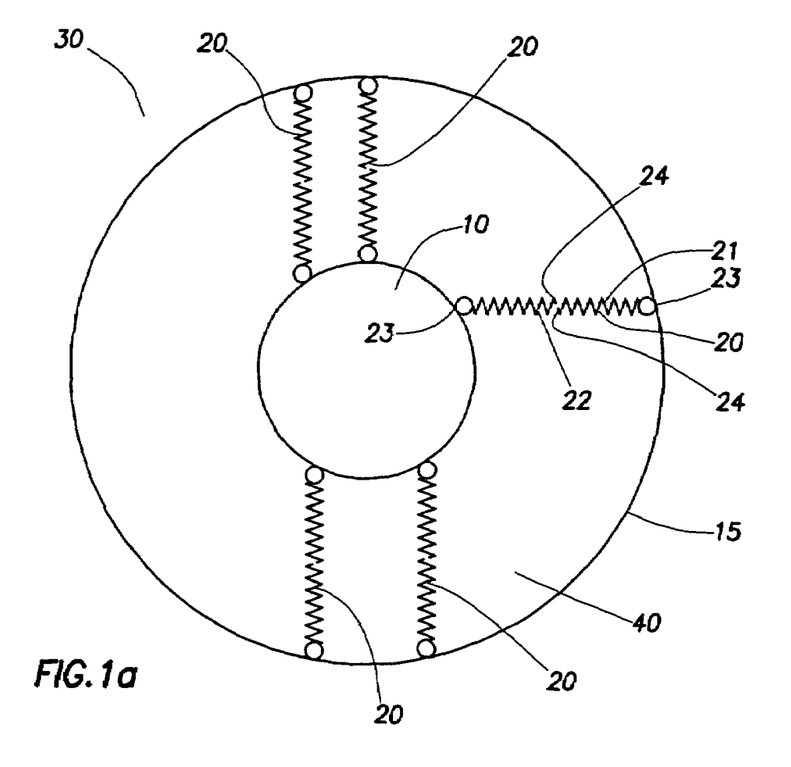
FIG. 1a is a schematic drawing of a vesicle structure of one embodiment of the present invention.

Vesicles are best described as a "water-in-water" emulsion. FIG. 1a is a schematic of one embodiment of a vesicle of the present invention shown as vesicle 15. Vesicle core water 10 lies at the approximate center of the vesicle structure.

Surfactant chains 20 are formed from at least two surfactant molecules, shown in FIG. 1a as first surfactant molecule 21 and second surfactant molecule 22. Each surfactant molecule has hydrophilic end 23 and hydrophobic end 24. As can be appreciated from FIG. 1a, surfactant chains 20 are formed from the attraction of hydrophobic ends 24 of the surfactant molecules. At least one hydrophilic end 23 of surfactant chain 20 joins vesicle core water 10. Surrounding water 30 surrounds vesicle 15. At least one hydrophilic end 23 of surfactant chain 20 adjoins surrounding water 30. While FIG. 1a depicts only a few surfactant chains 20 for simplicity, thousands or millions of individual surfactant chains form each vesicle 15 and surround core water 10. Among the surfactant chain 20 is non-aqueous solvent 40 that facilitates the structure of vesicle 15. Vesicle 15 as shown is unilamellar. A multilamellar vesicle structure is similar in structure, with surrounding water 30 becoming a new core water layer for the next layer of surfactant chains.

Many different types of surfactants may be used to form the viscoelastic surfactant diverting fluids. For instance, the mixture of a cationic and an ionic surfactant with water and a non-aqueous solvent will form such a vesicle. Double-tailed surfactants, amphoteric surfactants, and anionic surfactants may also be used. Generally, any surfactant/water/non-aqueous solvent combination that forms a vesicle of greater than 100 Å will function as a diverting fluid.

Figure 2:
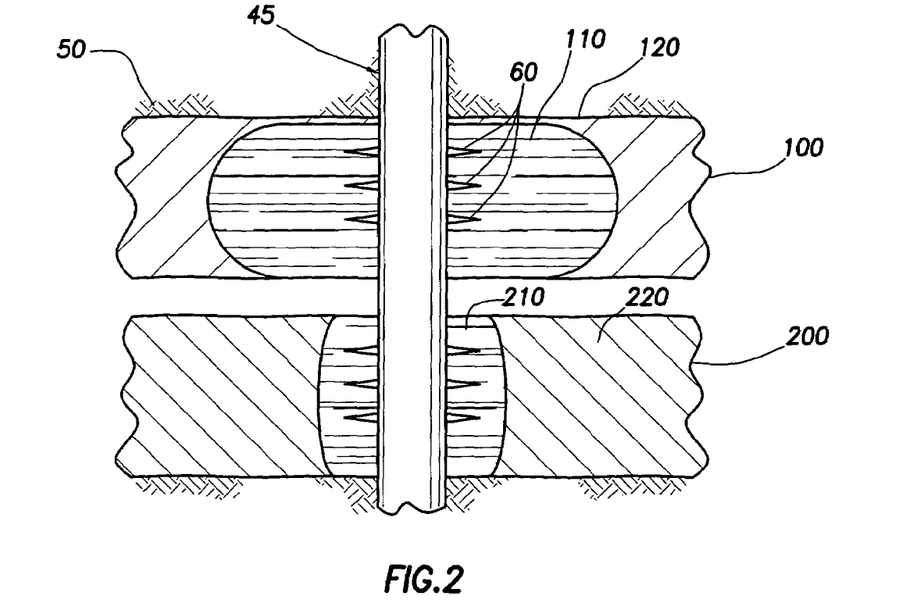
FIG. 2 is a schematic drawing of the traditional flow pattern of acid in a matrix acidizing treatment.
Figure 3:
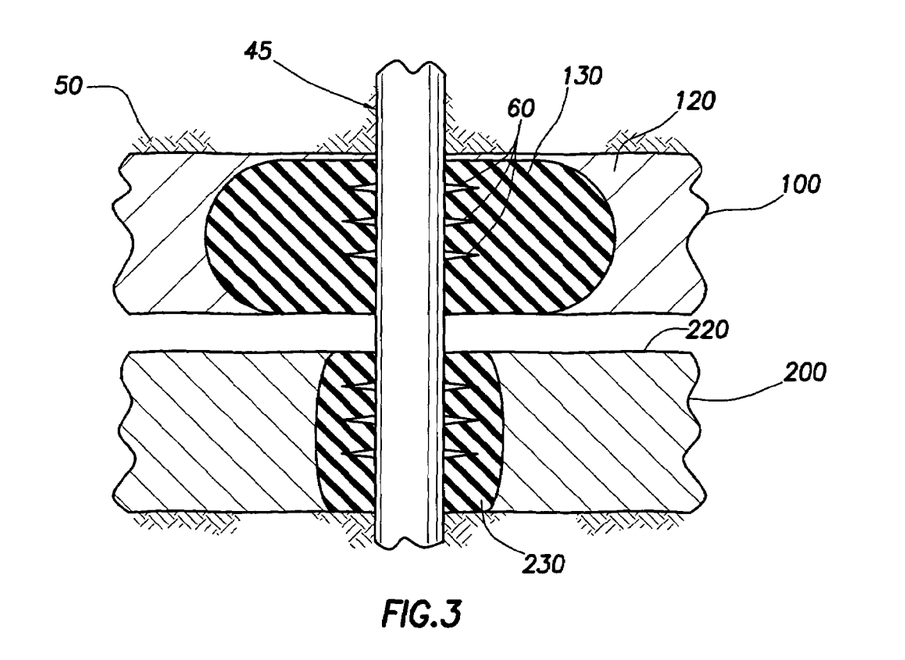
FIG. 3 is a schematic drawing of the flow pattern of the diverting fluid in one embodiment of the present invention.
Figure 4:
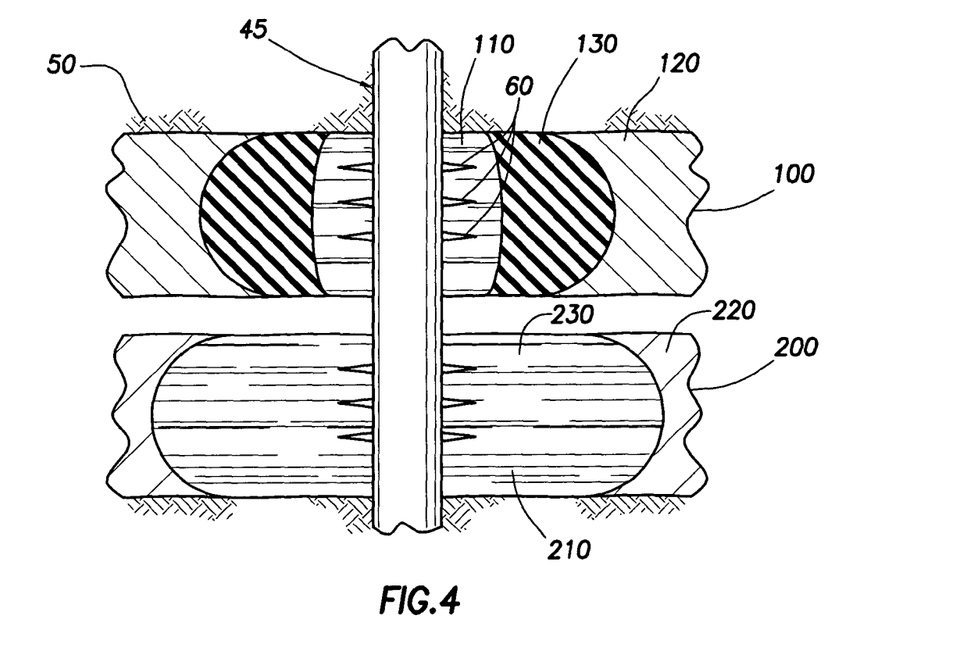
FIG. 4 is a schematic drawing of the acid flow pattern following treatment using one embodiment of the present invention.

Without diversion during matrix injection, the stimulating fluid would normally be injected into the portion of formation at the point of least resistance. This portion of the formation is typically associated with the highest permeability or least amount of formation damage. A pressure increase in the high permeability or undamaged portion of the formation or diverting agent would be required to change the injection profile. FIGS. 2–4 illustrate the principle of this invasion profile and FIG. 8 demonstrates the leak-off rate of a viscoelastic surfactant fluid in a formation with differing permeabilities.

FIG. 2 is a schematic depicting the effect of traditional acid treatment in formation 50 having high permeability zone 100 and low permeability zone 200. Wellbore 45 extends vertically through high permeability zone 100 and low permeability zone 200. Perforations 60 are orifices in wellbore 10 designed to be able to pass fluid from the interior of wellbore 10 into formation 50. The traditional acid treatment penetrates high permeabilty zone 100 into high permeability acid penetration zone 110 and low permeability zone 200 into low permeability acid penetration zone 210. The acid treatment does not penetrate into untreated high permeability zone 120 and untreated low permeability zone 220. As can be appreciated from FIG. 1, the traditional acid treatment has a greater penetration into high permeabilty zone 100 than low permeability zone 200.

FIG. 3 is a schematic depicting formation 50 into which a diverting fluid of one embodiment of the present invention has been injected. The diverting fluid penetrates high permeability zone 100 into high permeability diverting fluid zone 130 and low permeability zone 200 into low permeability diverting fluid zone 230. The diverting fluid does not penetrate into untreated high permeability zone 120 and untreated low permeability zone 220. As can be appreciated from FIG. 3, it is apparent that the diverter fluid of the present invention will preferably enter into higher permeability zone 100. Thus, when the diverting fluid is pushed into a production zone with various permeabilities, the majority of the diverting fluid will enter into the high permeability or non-damaged zone and form a temporary "plug" or "viscous pill" while the lower permeability zone has little invasion. This temporary "viscous pill" causes a pressure increase and diverts the fluid to a lower permeability portion of the formation.

FIG. 4 is a schematic depicting formation 50 into which an acid treatment has been performed following diverting fluid injection. As can be appreciated from FIG. 4, acid treatment penetration in low permeability zone 200 is greater than the penetration into high permeability zone 100 following use of the diverting fluid.

Figure 8:
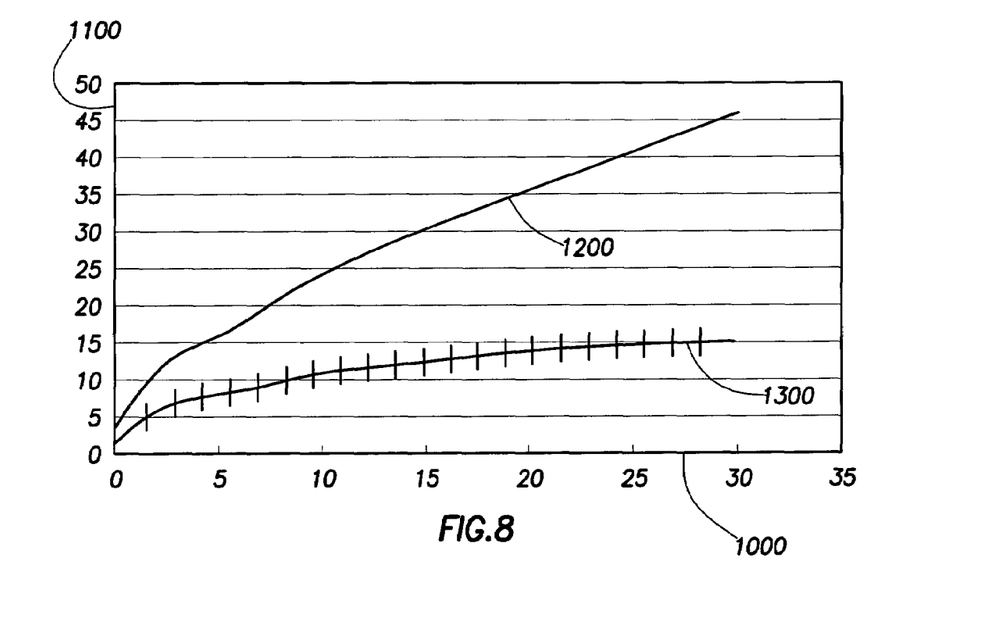
FIG. 8 is a graphical representation of the fluid leak-off comparison in cores with different permeabilities for the diverting fluid in one embodiment of the present invention.

FIG. 8 is a graphical representation of a test depicting the permeability of one embodiment of the present invention. X-axis 1000 measures the time in minutes the formation is exposed to the diverting agent. Y-axis 1100 measures the volume of diverting fluid that enters the formation. Leakoff line 1200 charts the rate in which the diverting fluid of one embodiment of the present invention enters a formation (leakoff rate) with a permeability of 150 milliDarceys (mD). Leakoff line 1300 charts the rate in which the diverting fluid of one embodiment of the present invention enters a formation with a permeability of 50 mD. As can be appreciated from FIG. 8, the leakoff rate for one embodiment of the present invention is higher for the more permeable portion of the formation than the less permeable portion. This confirms the diverting fluid will preferentially enter the more permeable section of the formation and block later entry of acid treatment to a greater extent than the less permeable section.

An operator may control leak-off of the stimulating fluid to the formation by controlling the size differential between the vesicles and the pore throats. As the size differential increases, for example, because of a permeability decrease or damage, the invasion of the vesicles into the formation is reduced. Conversely as the size differential decreases, for example, because of a permeability increase, the invasion into the formation increases. Once in place, the viscous pill formed by the diverting fluid in the formation will have a finite depth of invasion related to the pore throat diameter. Typically, for a given formation type, the invasion depth is directly proportional to the nominal pore throat diameter of the formation. As the fluid stops moving in the formation, the amount of injection pressure into this interval will also increase. At some point during injection, the pressure required to inject the stimulation fluid into this interval will exceed the pressure required to inject the stimulation fluid into other portions of the interval and diversion will be achieved.

The viscous pill may be placed across the entire formation. Varying depths of invasion will then occur throughout the formation based upon the varying permeability or damage throughout the interval. The ability of the viscoelastic fluid to invade into these pore throats will vary depending on the difference between pore throat sizing of the damaged and non-damaged formation materials. Invasion depths will normally be greater in the cleaner or non-damaged portion of the formation (larger pore throats) than in the lower permeability or damaged zones (smaller or partially filled pore throats). With a greater depth of invasion in the cleaner sections of the formation, more of the diverting pill may be placed in these intervals.

The diverting fluid of invention may also have an internal breaker built into the system to insure that the fluid viscosity can be reduced after a period of time. The vesicle viscoelastic fluids generally lose viscosity at a low pH as shown in FIG. 5. FIG. 5 is a graphical depiction of the viscosity of the diverting fluid in one embodiment of the present invention which illustrates the dependence of the viscosity of the diverting fluid on temperature and pH. X-axis 300 measures the temperature of the diverting fluid measured in degrees Fahrenheit. Y-axis 400 measures the viscosity of the diverting fluid measured in centipoise. Diverting fluid line 310 depicts the viscosity of the diverting fluid of one embodiment of the present invention at a pH of 12, diverting fluid line 320 at a pH of 11, diverting fluid line 330 at a pH of 10, diverting fluid line 340 at a pH of 9, and diverting fluid line 350 at a pH of 8.

By controlling the time in which the acid-forming agent reduces the pH, the time required for the fluid to lose viscosity may be controlled, creating a fluid that can be broken at a desired time. This internal breaker will ensure that even without acid interaction, the viscous gel will be broken and will not leave residual damage to the higher permeability formation. Generally, after the diverting fluid is broken, the formation will return to the same viscosity as before the diverting fluid was applied. Traditional viscoelastic fluids rely upon the interaction with hydrocarbons to break the ionic bonds of the fluid or formation fluids to dilute the system and reduce the initial viscosity. This interaction may or may not be achieved based upon the formation fluid make-up. These fluids are also not affected by a reduction in pH. Without the interaction of formation of hydrocarbon fluids with the pills, a reduction in viscosity may not occur and a high viscous pill may remain in formation and reduce the production rates.

The percentage of internal breaker in the diverting fluid will typically depend upon the type of internal breaker and the desired time for reducing the diverting fluid pH. The internal breaker may range from about 0.005 to about 10% of the total fluid, preferably 0.01 –5%, most preferably 0.05–2%, all by weight, but may be higher or lower if desired.

The internal breaker may be an ester, an organic or inorganic acid, an anhydride, an acid halide, a polyglycolic acid or mixtures thereof. Examples of these include, but are not limited to, methyl formate, ethyl formate, propyl formate, butyl formate, methyl acetate, ethyl acetate, propyl acetate, butyl acetate, ethylene glycol monobutyl acetate, ethylene glycol diacetate, acetic anhydride, acetic formic anhydride, succinic anhydride, tetrachlorophthalic anhydride, chloro ethyl formate, chloro ethyl acetate, polyglycolic acid, ethylene glycol diacetate, ethylene glycol triacetate, and the like and mixtures thereof. The internal breaker may also be an oxidizer such as, but not limited to, persulfates, such as ammonia persulfate and sodium persulfate, and peroxidizers such as hydrogen peroxide. These compounds may also be used in combination when desired.

Throughout the treatment, as injection is continued and the treating pressure decreases due to the removal of damage in other portions of the interval or the loss of viscosity of the diverting pill, additional diverter stages may be pumped. By alternating the pumping of acid stimulation fluids and diverting fluids, the heterogeneous formation may be appropriately treated. A typical pumping schedule for an non-polymer diverting pill may be as following:

1. Injecting an acid stimulation fluid package;
2. Optionally pumping a spacer fluid;
3. Injecting a viscoelastic surfactant diverting fluid;
4. Optionally, followed by pumping a spacer fluid; and
5. Repeat step 1 to 4 as necessary.

The acid stimulation fluid may include an acid, corrosion inhibitor, demulsifier or non-emulsifier, mutual solvent, and other components known to those of skill in the art. Acids may include inorganic acids such as hydrofluoric, hydrobromic, hydrochloric, and $H_2CO_3$, and organic acids such as acetic acid, formic acid, and citric acid. Mutual solvents include such compounds as ethylene glycol, monobutyl ether, and dipropylene glycol methyl ether. The spacer fluid typically contains a salt solution such as NaCl, KCl and/or $NH_4Cl$.

Preferably, the injection pressure of the diverting fluid is less than the fracture pressure of the formation. This fracture pressure will depend upon the type of formation.

The final injection pressure of the spacer fluid or acid stimulation fluid will generally be lower than original injection pressure, demonstrating damage removal or stimulation of portions of the zone that were not included in the initial injection. If necessary, steps 1 to 4 may be repeated to improve the placement of stimulation fluids by monitoring the treating pressure, bottom hole pressure, or surface pressure reading.

A reduction in pH of the vesicle structured viscoelastic fluid will cause a reduction in the fluid viscosity. In most stimulations, a stage of acid is injected following the diverting stage. As the stimulation fluid enters the formation and comes in contact with the viscous pill, the acid or low pH fluid will reduce the pill's viscosity. As the viscosity of the pill is reduced, fluid enters that portion of the reservoir. Because the diverting fluid will most often have less penetration into the damaged or less permeable section of the formation, there is less diverting fluid in the damaged or less permeable section of the formation in a bulk sense. As a result, acid from a later acid treatment or resulting from the acid-forming compounds of an internal breaker will remove all or nearly all of the diverting agent from the damaged or less permeable section of the formation before that of the undamaged or more permeable section. This action allows penetration of the acid treatment in the damaged or less permeable section of the formation before that of the undamaged or more permeable section. The oxidizing agent type of internal breaker is believed to result in the same effect, but by a different mechanism of actually breaking up the surfactant chains of the vesicles. With less of the pill volume in the lower permeability zones, viscosity loss normally occurs more rapidly. As the viscosity of the pill is reduced, and with less volume in the damaged interval, the pressure restriction causing diversion is normally reduced and the stimulation fluid enters that area of the formation. This formation invasion profile is a reason for the successful diversion of the acid treatment.

In one embodiment of the present invention the viscoelastic surfactant diverting fluid is comprised of:

1) one or more amphoteric surfactants
2) water, including, but not limited to, sea water or fresh water, and
3) a non-aqueous solvent.

These components are preferably combined in percentages that are appropriate for the formation to be stimulated. Generally, the diverting fluid contains amphoteric surfactants of about 1 to about 50 weight percent, preferably about 1 to about 40 weight percent, and even more preferably about 2 to about 20 weight percent, based upon the weight of the fluid. Non-aqueous solvents are generally present in ranges from about 0.1 to about 25 weight percent, preferably about 0.5 to about 20 weight percent, and more preferably at about 1 to about 15 weight percent, based upon the weight of the fluid.

The water may be fresh water or salt water. The water may also contain a salt. Useful salts include, but are not limited to, potassium chloride, sodium chloride, cesium chloride, ammonium chloride, calcium chloride, magnesium chloride, sodium bromide, potassium bromide, cesium bromide, calcium bromide, zinc bromide, sodium formate, potassium formate, cesium formate, sodium acetate, and mixtures thereof. The percentage of salt in the water preferably ranges from about 0% to about 60% by weight, based upon the weight of the water.

The pH of the diverting fluid may be adjusted when desired. When adjusted, it typically has a value of about 6.5 or more, 7 or more, 8 or more, 9 or more, between 9 and 14, and, most preferably, between 7.5 and 9.5. The pH may be adjusted by any means known in the art, including adding acid or base to the fluid, or bubbling $CO_2$ through the fluid and the like.

A variety of amphoteric surfactants may be used. Examples include, but are not limited to imadazoline, alkyl betaine, alkyl amine oxide, and lecithin. In a preferred embodiment, the lecithin may be obtained from soybeans and may be composed mostly of phosphatidylcholine, phosphatidylethanolamine, and phosphatidylinositol. The amphoteric surfactant may be chemically or enzymatically modified. The lecithin may be natural or synthetic lecithin. Additional information on lecithin and its many variants, may be found in Kirk-Othmer Encyclopedia of Chemical Technology, 4$^{th}$ ed. Volume 15, pages 192–210, John Wiley & Sons, 1995, Lecithins Sources, Manufacture & Uses, by Bernared F. Szuhaj, American Oil Chemist' Society, 1985 and Lecithins, by Bernard F. Szuhaj and Gary R. List, American Oil Chemists' Society, 1985.

The non-aqueous solvent is typically one or more hydrocarbons and/or halogenated hydrocarbons, although other non-aqueous solvents also function appropriately. Examples of the non-aqueous solvents include, but are not limited to, aliphatic hydrocarbons, aromatic hydrocarbon, alcohols, mineral oils, organic oils such as a soybean oil or a corn oil, fatty acids, glycol ethers, ethers, or mixtures thereof. An example of an alcohol useful in the composition is a linear, branched, or cyclic $C_1$ to $C_{20}$ alcohol, such as a linear or branched $C_4$ to $C_{20}$ alcohol. Examples of these solvents are 2-ethyl hexanol, ethylene glycol, monobutyl ether, ethylene glycol monobutyol, or mixtures thereof.

The diverting fluid may contain other compounds to assist in its function. Examples include, but are not limited to, corrosion inhibitors, fluid loss additives, gases such as carbon dioxide or nitrogen, and the like. This diverting fluid preferably contains less than 30% gas by volume, preferably less than 10%, and most preferably less than 5% gas. The diverting fluid is preferably polymer-free, but may contain some polymers to facilitate its function.

Further examples of fluids useful in this invention may be found in related application Ser. Nos. 09/648,327 and 09/383,323, which are hereby incorporated herein by reference in their entirety.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Viscosity was measured by Fann50 rheometer. The pressure readings were recorded through field applications of the fluid.

Example 1

A viscous solution was prepared by adding 10 ml of ethylene glycol monobutyl ether to 63 ml of a 3% by weight solution of a potassium chloride solution. Then, 25 grams of a 63% by weight solution of amphoteric lecithin was mixed into the solution and 2 ml of a 30% by weight sodium hydroxide solution were added to increase the pH to 12. The viscosity was measured at 100 sec$^{-1}$ at increasing temperatures. The solution maintained a viscosity above 100 cp at temperatures up to 230° F.

Example 2

A viscoelastic solution was prepared in the same manner described in example 1. Ethyl formate was added at 3.75 pounds/thousand gallons (gpt). In another sample 3.75 gpt of ethyl formate was added with methanol at 50 to 75 gpt. Within 1 hour, the fluid viscosity decreased to below 50 cp at 180° F. for both samples.

Example 3

A 10% HCl acid and 9% HCl/1% HF mud acid treatment was injected into the formation to improve connection to the near-wellbore region. The acid treatment was separated into three stages so as to treat the entire interval with a viscoelastic diverter pill designed to improve acid coverage across the zone.

After injecting the first HCl/HCl—HF acid stages into formation, the treating pressure on the annulus decreased from 1,800 psi to 550 psi at a rate of 3 barrels/minutes (bpm). When the 5% NH$_4$CL spacer reached the formation, the annulus pressure stabilized at 550 psi. Approximately 4 bbls of the viscoelastic solution of Example 1 were pumped to achieve the diversion. Once the viscoelastic diverter pill reached the perforation, an increase in annulus pressure was observed. The rate of diverter fluid injection was held constant at 3 bpm. Following approximately 6 minutes of pressure increase totaling an additional 130 psi the injection rate of the treatment was increased to 5 bpm. Following the rate increase, annulus pressure rose to approximately 1,950 psi.

Over the next 8 minutes of fluid injection, a stabilized pressure profile was observed as the second stage of 5% NH$_4$Cl spacer and HCL/HCl—HF acids were injected into the formation. This stabilized pressure response was indicative of acid diversion into a secondary portion of the interval. After a slight rate increase with another stabilized pressure response, the annulus pressure again began a very rapid pressure decrease. This indicated acid diversion and clean-up in a new portion of the perforated interval or indicating that the diverter pill had lost viscosity and effective "bridging" or diversion.

Figure 6:
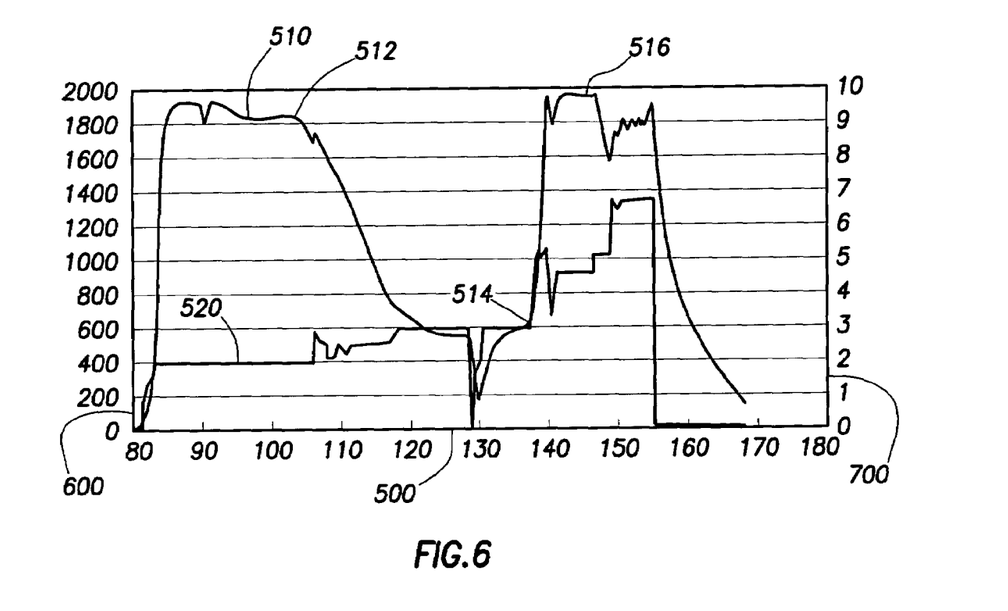
FIG. 6 is a graphical representation of the pressure readings described in Example 3.

The fluid injection rate was increased to 6.5 bpm and annulus pressure increased to 1,800 psi. This pressure was the same as the initial injection pressure at 2 bpm, indicating no long term formation damage from the diverter, and also indicating near-wellbore damage removal from the acid. FIG. 6 is a graphical representation of the process described in Example 3 herein. X-axis 500 measures time in minutes of the process. Y-axis 600 measures the casing pressure of fluid in the formation in psi, as measured at the surface. Y-axis 700 measures the rate of the fluid being pumped in bpm. Fluid pressure line 510 charts the casing pressure of the fluid during the process described in Example 3. Job rate line 520 charts the flow rate of the fluid during the process described in Example 3. Initial acid injection point 512, spacer fluid pump point 514 and second acid injection point 516 depicted along fluid pressure line 510 are graphical designations of stage one acid injection, spacer pumping and stage two acid injection, respectfully.

Example 4

This visco-elastic surfactant diverter of Example 1 was used to divert a 10% Acetic/5% HCl acid blend and a 10% Acetic/5% HCl/1% HF mud acid treatment into a 50 gross, 15 foot net gas reservoir at a measured depth of 17,500 feet. Bottom hole temperature in this interval was recorded at 237° F.

The acid treatment was separated into two stages to best treat the two separate intervals with one diverter pill planned. Once the first acetic-HCl acid stage reached formation, the treating pressure on the annulus decreased from 500 psi to 280 psi at a rate of 1.1 bpm. As injection was continued with the acetic/HCl acid and the acetic/HCl/HF, the mud acid rate was increased to 1.5 and 1.8 bpm while the annulus pressure continued to decrease. After the acid was displaced into formation, the acid rate was increased to 2.2 bpm. A $NH_4Cl$ spacer fluid was then pumped downhole. When the 5% $NH_4Cl$ spacer reached the formation, the annulus pressure stabilized at 275 psi. Once the 5 bbls of the viscoelastic diverter pill reached the perforations, a 250 psi increase in annulus pressure was observed as the pumping rate was held constant at 2.2 bpm.

Following the placement of the diverter pill, the second stage of treatment was injected into the formation at 2.2 bpm. As the second stage of acetic-HCl and acetic-HCl—HF mud acid entered the formation, the pressure decreased from 500 psi to 200 psi on the annulus over 10 minutes.

When the pressure finally "leveled" at the spacer injection rate of 2.2 bpm, the injection pressure was lower than the initial injection pressure at 2.2 bpm with the same fluid (5% $NH_4Cl$). This pressure response indicated that the acid had removed near-wellbore damage and that new sections of the interval were accepting fluids. The pressure response indicated that there was no long term formation damage from the diverter.

Figure 7:
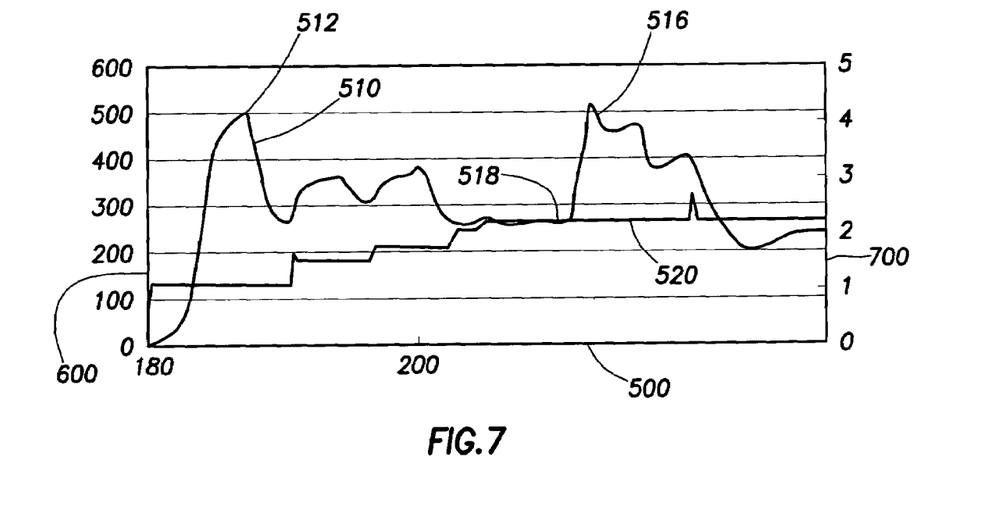
FIG. 7 is a graphical representation of the pressure readings described in Example 4.

FIG. 7 is a graphical representation of the process described in Example 4 herein. Diverting fluid injection point 518 is a graphical designation of the diverter pill injection.

Example 5

The viscoelastic surfactant solution of Example 1 was used to divert a 10% HCl matrix acid treatment across a 54 foot reservoir that had sustained damage due to excessive completion fluid losses following the completion. Due to the non-heterogeneity of the reservoir, the acid treatment was separated into three stages to best treat the interval with two diverting pills planned. Formation temperature was measured at 200° F.

During injection of the first HCl acid stage at 1.75 bpm, a large pressure drop (2,000 psi) on the annulus was observed. This is indicative of damage removal near-wellbore, and was most achieved in the lower 16 feet of clean reservoir. Following this pressure drop, treating pressure on the annulus stabilized at 2000 psi. When the 5 bbls of the first diverter pill reached the formation, the annulus pressure increased by 500 psi as the rate remained constant at 1.75 bpm. This pressure increase indicated the temporary restriction of injection into a portion of the reservoir. As the second stage of HCl acid reached the formation, the annulus pressure decreased rapidly 200 psi below initial injection pressure, indicating that other portions of the reservoir were beginning to accept fluid injection. The second diverting pill was then pumped. When this pill reached the formation, a second annulus pressure increase of more than 500 psi was observed. As the third stage of HCl acid was injected following the diverter pill, the annulus pressure again decreased rapidly to the initial injection pressure and then leveled off. Following the third acid stage, once the diverter was removed, no flow restriction into the formation was apparent. A steady pressure decrease was observed after the last acid stage. This pressure response indicated that no long term injection restriction from the diverter was present, and indicated the removal of near-wellbore damage from the diversion of the acid.

Figure 7A:
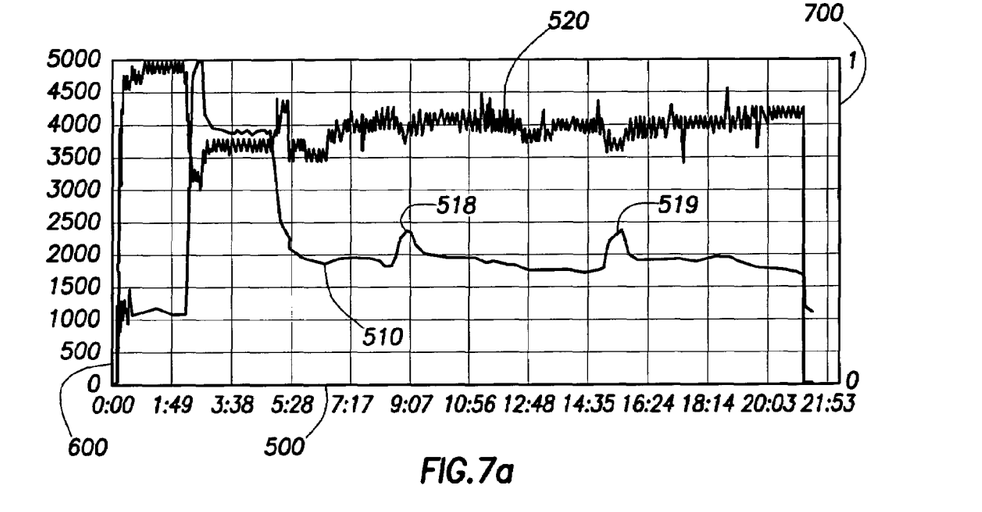
FIG. 7a is a graphical representation of the pressure readings described in Example 5.

FIG. 7a is a graphical representation of the process described in Example 5 herein. Second diverting fluid injection point 519 is a graphical designation of the second diverter pill injection.

Other embodiments and uses of the invention will be apparent to those skilled in the art from consideration of the specification and practice of the invention disclosed herein. Although the invention has been described with respect to preferred embodiments, the foregoing description and examples are intended to be merely exemplary of the invention. Not all embodiments of the invention will include all the specified advantages. The true scope and spirit of the invention is not intended to be limited by the foregoing description and examples, but instead is intended to be commensurate with the scope of the following claims. Variations and modifications on the elements of the claimed invention will be apparent to persons skilled in the art from a consideration of this specification or practice of the invention disclosed herein.

What is claimed is:

1. A process of diverting stimulation fluids from high permeability or non-damaged intervals to low permeability or damaged intervals, which comprises injecting into a formation a diverting fluid and thereby blocking the high permeability or non-damaged intervals, the diverting fluid comprising vesicles and an internal breaker capable of reducing the viscosity of the diverting fluid after a period of time, wherein the injection is carried out at a pressure lower than the fracture pressure of the formation.

2. The process of claim 1, wherein the vesicles are larger than 100 Å.

3. The process of claim 2 wherein the vesicles have a diameter of between about 200 Å and about 50 microns.

4. The process of claim 2, wherein the vesicles comprise a surfactant.

5. The process of claim 4, wherein the surfactant comprises an anionic surfactant, an amphoteric surfactant, a double-tailed surfactant, a cationic/anionic surfactant mixture, or mixtures thereof.

6. The process of claim 1, wherein the vesicles further comprise a non-aqueous solvent.

7. The process of claim 1, wherein the vesicles are unilamellar, multilamellar, or both.

8. A process of diverting stimulation fluids from high permeability or non-damaged intervals to low permeability or damaged intervals, comprising injecting into a formation a diverting fluid comprising lecithin, water, and a non-aqueous solvent, and further wherein the injection is carried out at a pressure lower than the fracture pressure of the formation.

9. The process of claim 8, wherein the diverting fluid forms vesicles.

10. The process of claim 8, wherein the water is fresh water or sea water.

11. The process of claim 10, wherein the water comprises a salt.

12. The process of claim 8, wherein the lecithin comprises phosphatidylcholine, phosphatidylethanolamine, phosphatidylinositol, or mixtures thereof.

13. The process of claim 8, wherein the lecithin comprises a chemically or enzymatically modified lecithin.

14. The process of claim 8, wherein the percentage of lecithin present within the diverting fluid is between about 1 and about 50 percent, based on the weight of the fluid.

15. The process of claim 8, wherein the non-aqueous solvent comprises a hydrocarbon or halogenated hydrocarbon.

16. The process of claim 15, wherein the non-aqueous solvent comprises an aliphatic hydrocarbon, an aromatic hydrocarbon, an alcohol, a mineral oil, an organic oil, a fatty acid, an ether, a glycol ether or a mixture thereof.

17. The process of claim 16, wherein the non-aqueous solvent comprises an alcohol, and further wherein the alcohol is linear, branched, or cyclic.

18. The process of claim 16, wherein the percentage of non-aqueous solvent present within the diverting fluid is between about 0.1 and about 25 percent, based on the weight of the fluid.

19. The process of claim 8, wherein the diverting fluid further comprises an internal breaker.

20. The process of claim 19, wherein the internal breaker is an acid-forming compound or oxidizer.

21. The process of claim 20, wherein the internal breaker comprises an acid-forming compound and wherein the acid-forming compound comprises an organic acid, an inorganic acid, an ester, an anhydride, an acid halide, a polyglycolic acid, or a mixture thereof.

22. The process of claim 21, wherein the acid-forming compound comprises methyl formate, ethyl formate, propyl formate, butyl formate, methyl acetate, ethyl acetate, propyl acetate, butyl acetate, ethylene glycol monobutyl acetate, ethylene glycol diacetate, acetic anhydride, acetic formic anhydride, succinic anhydride, tetrachlorophthalic anhydride, chloroethyl formate, chloroethyl acetate, polyglycolic acid or a mixture thereof.

23. The process of claim 21, wherein the percentage of acid-forming compound present within the diverting fluid is between about 0.005 and about 10 percent, based on the weight of the fluid.

24. The process of claim 20, wherein the oxidizer comprises a peroxidizer or a persulfate.

25. The process of claim 9, wherein the vesicles are larger than 100 Å.

26. The process of claim 25 wherein the vesicles have a diameter of between about 200 Å and about 50 microns.

27. The process of claim 9, wherein the vesicles are unilamellar, multilamellar, or both.

28. The process of claim 5, wherein the surfactant comprises an amphoteric surfactant and further wherein the percentage of amphoteric surfactant present within the diverting fluid is between from about 1 to about 50 percent, based on the weight of the fluid.

29. The process of claim 1, wherein the diverting fluid further comprises a non-aqueous solvent.

* * * * *

UNITED STATES PATENT AND TRADEMARK OFFICE
CERTIFICATE OF CORRECTION

PATENT NO.       : 7,220,709 B1
APPLICATION NO.  : 10/100778
DATED            : May 22, 2007
INVENTOR(S)      : Qi Qu

It is certified that error appears in the above-identified patent and that said Letters Patent is hereby corrected as shown below:

Delete drawings sheet 1 of 5 and substitute therefor the drawing sheet, consisting of figs. 1-1a as shown on the attached page.

Signed and Sealed this

Twentieth Day of May, 2008

JON W. DUDAS
*Director of the United States Patent and Trademark Office*

FIG. 1

FIG. 1a